United States Patent
Chen

(10) Patent No.: US 10,328,597 B2
(45) Date of Patent: Jun. 25, 2019

(54) CUTTING MAT

(71) Applicant: Chi-Jen Chen, Xihu Township, Changhua County (TW)

(72) Inventor: Chi-Jen Chen, Xihu Township, Changhua County (TW)

(*) Notice: Subject to any disclaimer, the term of this patent is extended or adjusted under 35 U.S.C. 154(b) by 130 days.

(21) Appl. No.: 15/457,524

(22) Filed: Mar. 13, 2017

(65) Prior Publication Data

US 2018/0257251 A1  Sep. 13, 2018

(51) Int. Cl.
*A47J 47/00* (2006.01)
*B26D 7/20* (2006.01)

(52) U.S. Cl.
CPC .............. *B26D 7/20* (2013.01); *A47J 47/005* (2013.01)

(58) Field of Classification Search
CPC .................................................... A47J 47/005
See application file for complete search history.

(56) References Cited

U.S. PATENT DOCUMENTS

| | | | | |
|---|---|---|---|---|
| 2,778,324 A * | 1/1957 | Mattson | ............... | A21C 9/08 100/295 |
| 2,935,107 A * | 5/1960 | Bertelsen | ............... | A47J 47/005 269/13 |
| 5,100,115 A * | 3/1992 | Schorn | ............... | A47J 47/005 269/302.1 |
| 5,203,548 A * | 4/1993 | Sanders | ............... | A47J 47/005 269/289 R |
| 5,386,978 A * | 2/1995 | Ladwig | ............... | A47J 47/005 269/289 R |
| 6,460,841 B1 * | 10/2002 | Durr | ............... | A47J 47/005 269/289 R |
| 6,478,292 B1 * | 11/2002 | Sellers | ............... | A47J 47/005 269/285 |
| 6,789,792 B1 * | 9/2004 | Angland | ............... | A47J 47/005 269/289 R |
| 6,971,644 B1 * | 12/2005 | Kennedy | ............... | A47J 47/005 269/289 R |
| 8,943,661 B2 * | 2/2015 | Krohmer | ............... | B25B 11/00 269/289 R |
| 9,795,236 B2 * | 10/2017 | Smallman | ............... | B65D 1/34 |
| D819,413 S * | 6/2018 | Zemel | ............... | D7/698 |
| 2003/0140755 A1 * | 7/2003 | Chen | ............... | A47J 47/005 83/451 |
| 2006/0087067 A1 * | 4/2006 | Shamoon | ............... | A47J 47/005 269/289 R |
| 2012/0068396 A1 * | 3/2012 | Wirth, Jr. | ............... | B23Q 1/032 269/289 R |

\* cited by examiner

*Primary Examiner* — Tyrone V Hall, Jr.
(74) *Attorney, Agent, or Firm* — Egbert, McDaniel & Swartz, PLLC

(57) ABSTRACT

A cutting mat includes two baseboards, at least one foldable sheet connecting the two baseboards and multiple back antiskid units. Each baseboard has a cutting surface formed on a front thereof and a back, wherein the two baseboards are adjacent to each other and the foldable sheet is attached to the back of each of the two baseboards for connecting the two adjacent baseboards. The foldable sheet has a pre-folding line formed thereon along an abutment between the two adjacent baseboards such that the foldable sheet is folded along the pre-folding line to make the two baseboards completely abutting each other. The multiple back antiskid units are formed by printed antiskid layers that are distributed on the back of each of the two baseboards and a back of the foldable sheet.

2 Claims, 4 Drawing Sheets

CUTTING MAT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to cutting mat, and more particularly to a cutting mat that is foldable and has an antiskid layer printed on a back thereof.

2. Description of Related Art Including Information Disclosed Under 37 CFR 1.97 and 37 CFR 1.98

A conventional cutting mat usually has great area such that the conventional cutting mat is inconvenient for carrying. As a result, a foldable cutting mat is marketed. The conventional cutting mat has two baseboards adjacently connected to each other by a foldable sheet. Consequently, the area of the folded cutting mat becomes half.

As described above, an antiskid structure is provided to the conventional cutting mat to prevent the conventional cutting mat from being slipped during operating. With reference to FIG. 9, each baseboard 50 has a piece of antiskid pad 60 adhered thereon. However, there is no antiskid structure on the foldable sheet 70. The conventional antiskid pad 60 is made of plastic form material and has a thickness over 1.5 mm.

The conventional antiskid pad 60 is adhered to the back 51 of each of the two baseboards 50 such that the hardly once secured to the purposed position. The foam material may be shrunk or deteriorated. In addition, the material of the baseboard 50 is different from that of the antiskid pad 60 such that the antiskid pad 60 of the conventional cutting mat does not be recycled with the two baseboards 50. It will cause a pollution question. The two baseboards 50 of the conventional cutting mat cannot abut to each other and a triangle space is formed between the two baseboards 50 after the conventional cutting mat being folded because the thickness of the antiskid pad 60 is over 1.5 mm. The baseboards 50 of the conventional cutting mat may be transformed when being pressed during being packaged. Furthermore, there is no antiskid structure on the foldable sheet 70 of the conventional cutting mat such that the conventional cutting mat cannot provides a comprehensive antiskid effect.

The present invention has arisen to mitigate and/or obviate the disadvantages of the conventional cutting mat.

BRIEF SUMMARY OF THE INVENTION

The main objective of the present invention is to provide an improved cutting mat that has an antiskid layer disposed on a back of each of two adjacent baseboards thereof and a back of a foldable sheet that connects the two adjacent baseboards.

To achieve the objective, the cutting mat in accordance with the present invention comprises two baseboards, at least one foldable sheet connecting the two baseboards and multiple back antiskid units. Each baseboard has a cutting surface formed on a front thereof and a back, wherein the two baseboards are adjacent to each other and the foldable sheet is attached to the back of each of the two baseboards for connecting the two adjacent baseboards. The foldable sheet has a pre-folding line formed thereon along an abutment between the two adjacent baseboards such that the foldable sheet is folded along the pre-folding line to make the two baseboards completely abutting each other. The multiple back antiskid units are formed by printed antiskid layers that are distributed on the back of each of the two baseboards and a back of the foldable sheet, wherein the printed antiskid layer has a thickness about 0.05 mm to 0.5 mm.

Further benefits and advantages of the present invention will become apparent after a careful reading of the detailed description with appropriate reference to the accompanying drawings.

DETAILED DESCRIPTION OF THE INVENTION

Figure 1:
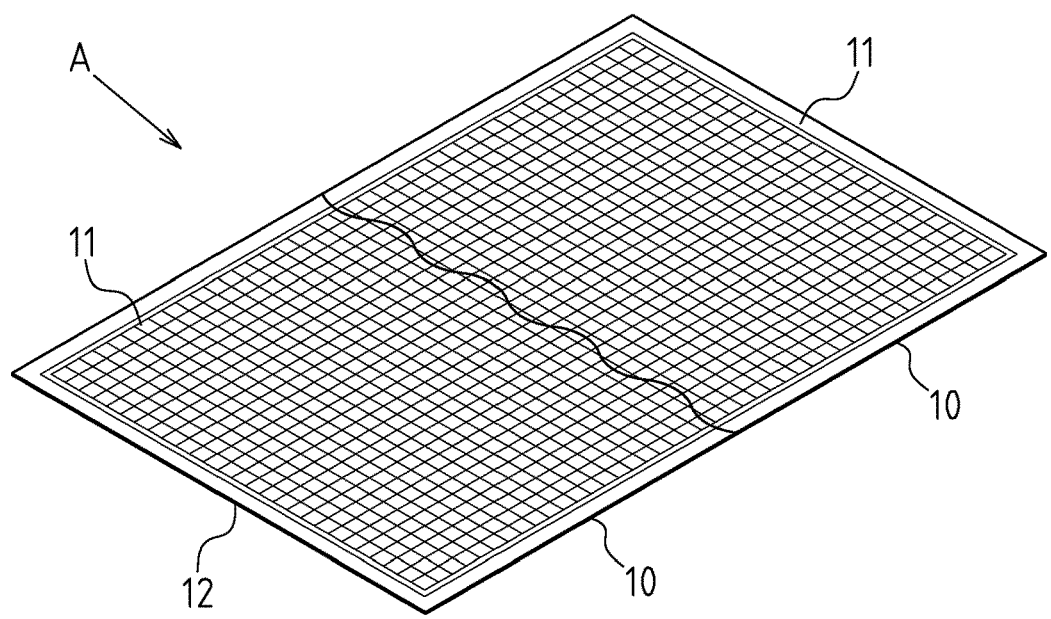
FIG. 1 is a front perspective view of a cutting mat in accordance with the present invention.
Figure 2:
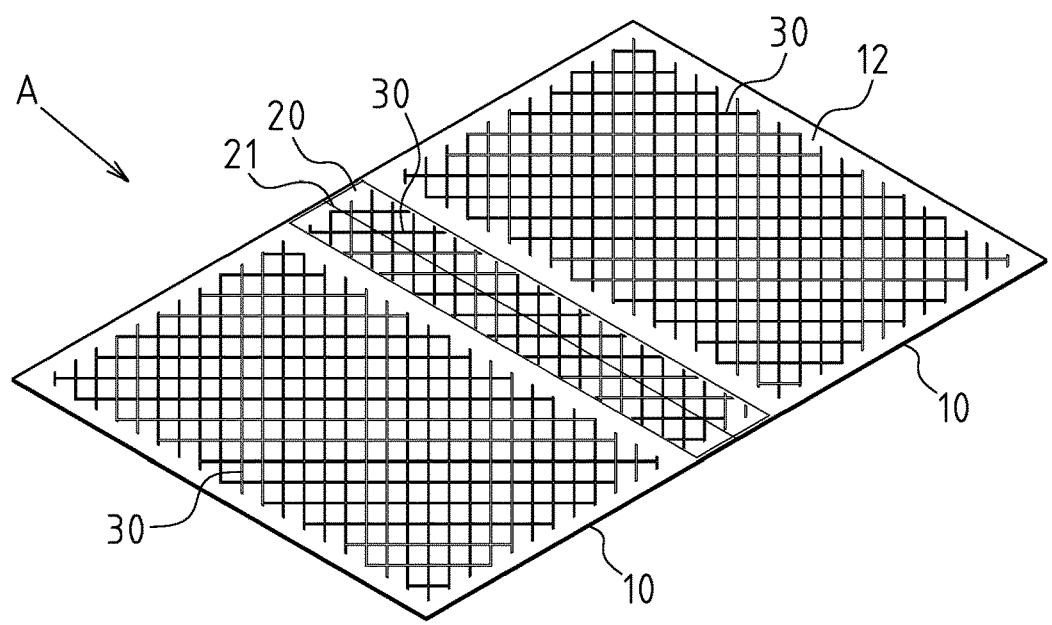
FIG. 2 is a rear perspective view of a cutting mat in accordance with the present invention.
Figure 3:
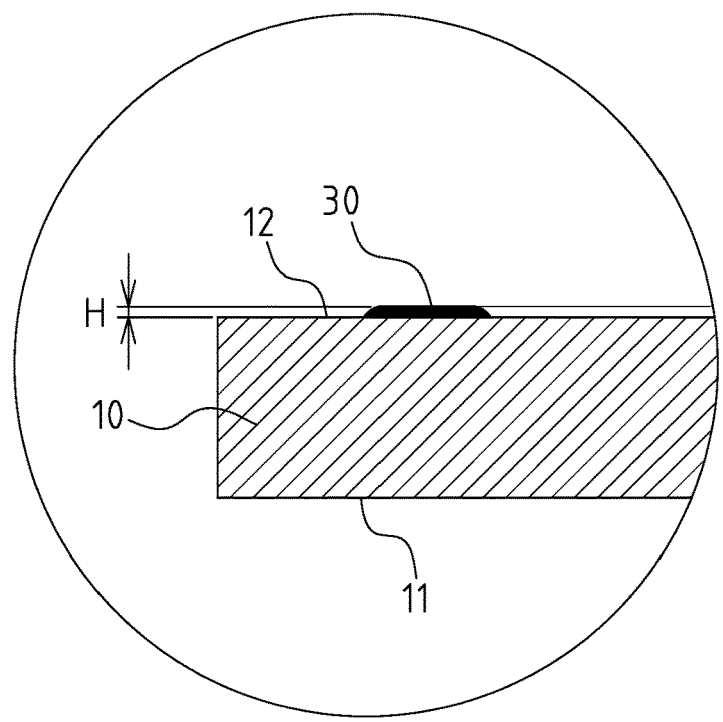
FIG. 3 is a partially enlarged cross-sectional view of the cutting mat in accordance with the present invention.
Figure 4:
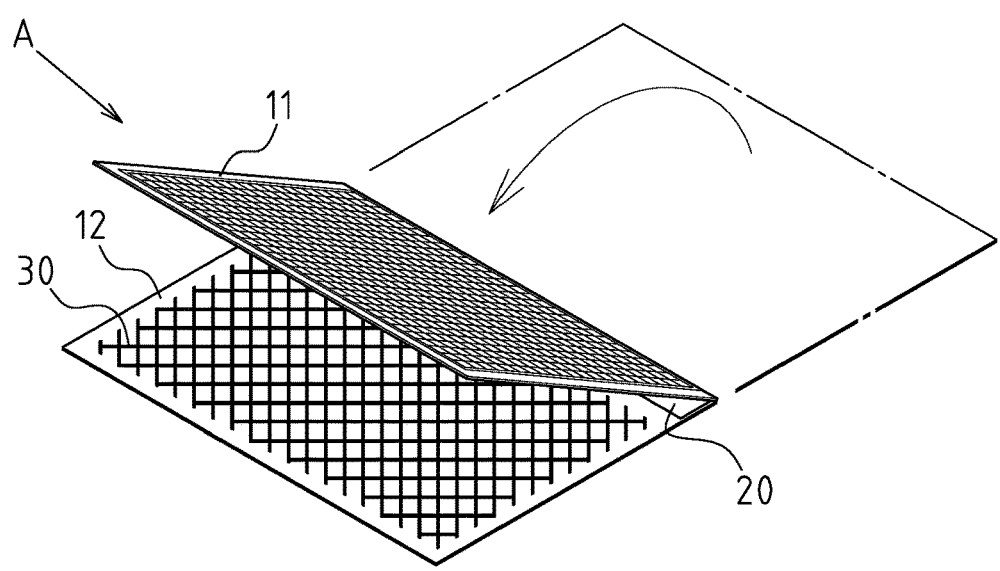
FIG. 4 is a perspective view of the cutting mat in accordance with the present invention when being folded along a pre-folding line.
Figure 5:
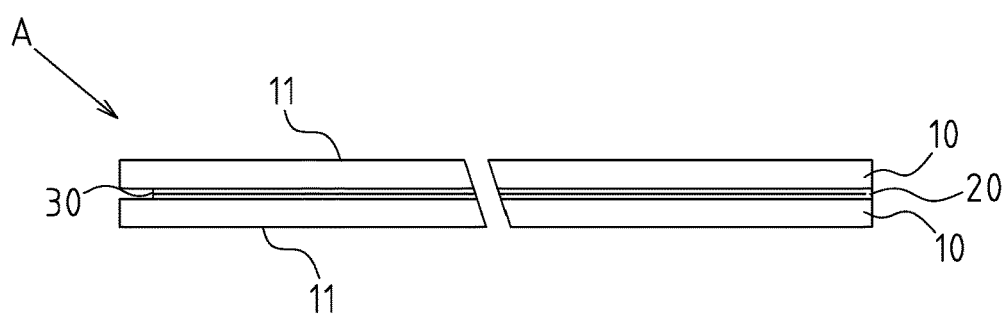
FIG. 5 is a side plan view of the cutting mat in accordance with the present invention after being folded.

Referring to the drawings and initially to FIGS. 1-5, a cutting mat A in accordance with the present invention comprises two baseboards 10, at least one foldable sheet 20 connecting the two baseboards 10 and multiple back antiskid units. Each baseboard 10 has a cutting surface 11 formed on a front thereof and a back 12. The two baseboards 10 are adjacent to each other and the foldable sheet 20 is attached to the back 12 of each of the two adjacent baseboards 10. The foldable sheet 20 has a pre-folding line 21 formed thereon along an abutment between the two adjacent baseboards 10 such that the foldable sheet 20 is folded along the pre-folding line 21 to make the two baseboards 10 abutting each other, as shown in FIGS. 4 and 5. The multiple back antiskid units are formed by printed antiskid layers 30 that are distributed on the back 12 of each of the two baseboards 10 and a back of the foldable sheet 20. As shown in FIG. 3, the printed antiskid layer 30 has a thickness H about 0.05 mm to 0.5 mm.

Figure 6:
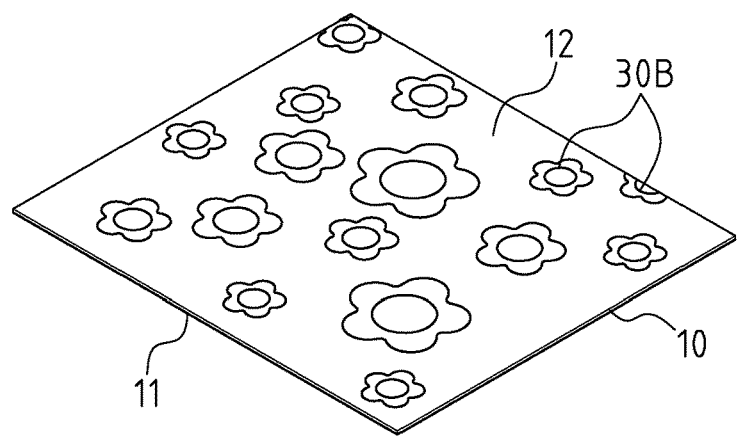
FIG. 6 is a perspective view of the cutting mat in accordance with the present invention for showing the antiskid layer being printed to have a flower-shape.
Figure 7:
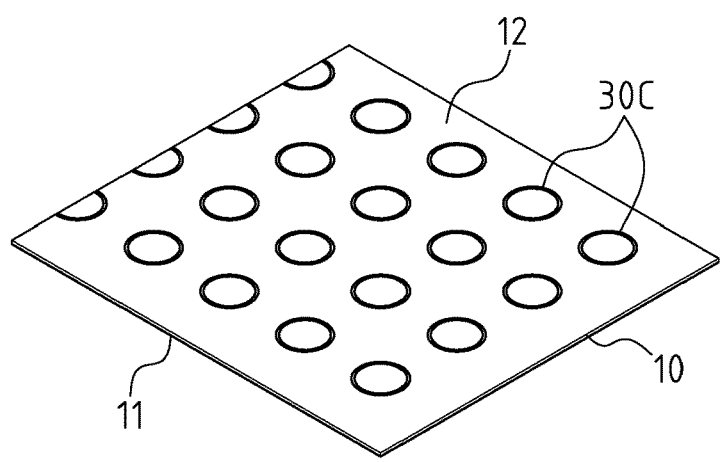
FIG. 7 is a perspective view of the cutting mat in accordance with the present invention for showing the antiskid layer being printed to have a round-shape.

The shape of the printed antiskid layer 30 is selected from the group consisted of squire grid, rhombus, dot, circle, strip and flower. However, the shape of the printed antiskid layer also is irregular. With reference to FIG. 6, the printed antiskid layer 30B has a flower-shape. With reference to FIG. 7, the printed antiskid layer 30C has a circle-shape. The shape of the printed antiskid layer 30/30B/30C is changeable such that the printed antiskid layer 30/30B/30C not only provides a function of antiskid but also makes the outward appearance of the cutting mat A in accordance with the present invention becoming more vivid.

In the preferred embodiment of the present invention, the foldable sheet 20 is a flexible plastic sheet for thinning the thickness of the foldable sheet 20.

Figure 8:
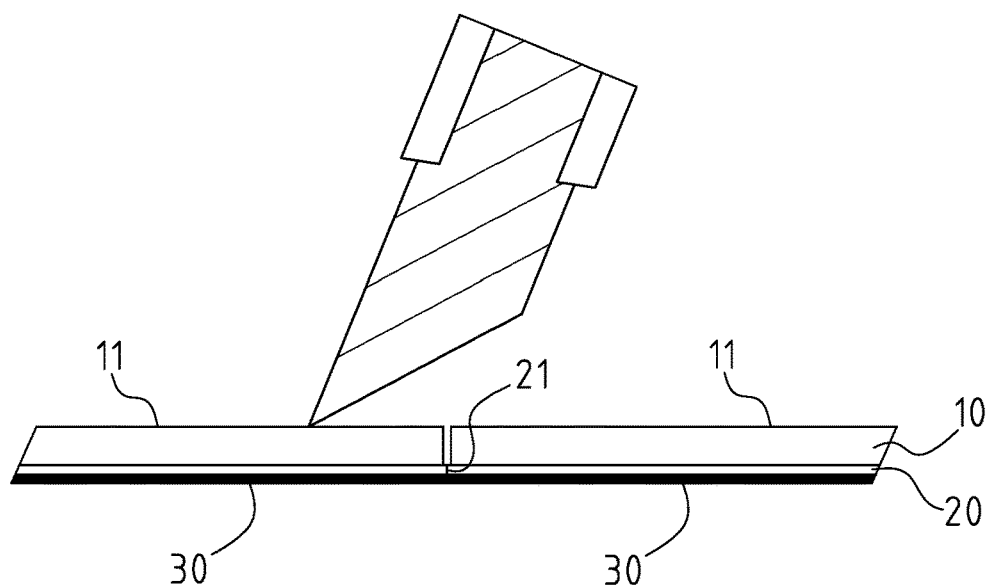
FIG. 8 is a side plan view of the cutting mat in accordance with the present invention for showing the antiskid layer printed over the foldable sheet.
Figure 9:
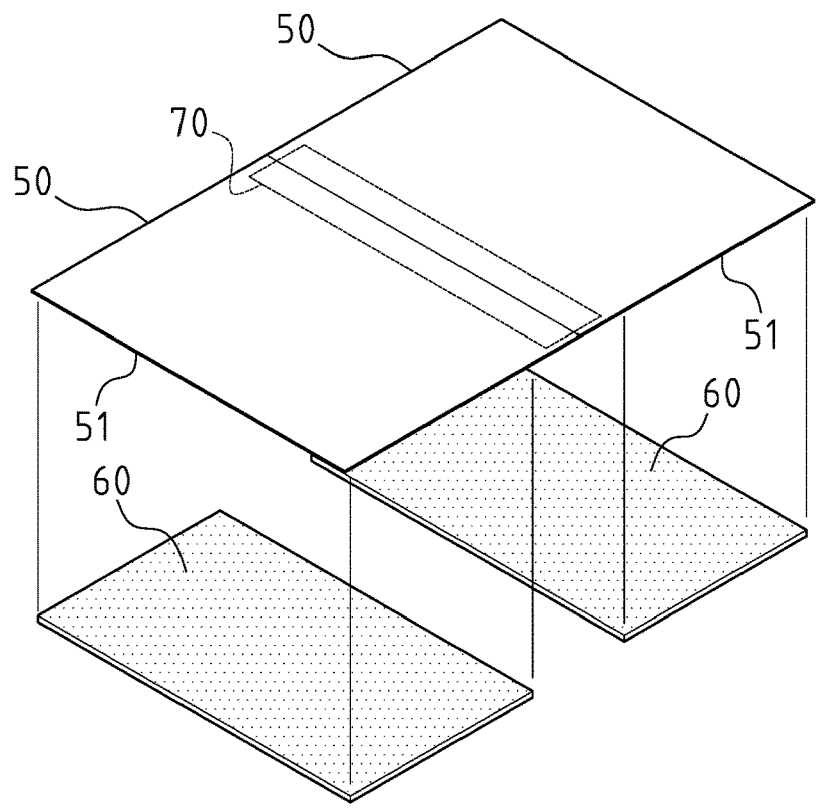
FIG. 9 is an exploded perspective view of a conventional cutting mat in accordance with the prior art.

The cutting mat A in accordance with the present invention is assembled by two baseboards 10, a foldable sheet 20 for connecting the two baseboards 10 and a printed antiskid layers 30 that are distributed on the back 12 of each of the two baseboards 10 and a back of the foldable sheet 20, wherein the printed antiskid layer 30 has a thickness H about 0.05 mm to 0.5 mm and can be quickly formed by ink. Consequently, with regards to manufacture the cutting mat A in accordance with the present invention, the antiskid structure has the advantages of once positioned to a purposed place on the back of the cutting mat A, cost down and save manpower. In addition, the thickness of the printed antiskid layer 30 is from 0.05 mm to 0.5 mm such that the backs 12 of the two baseboards 10 completely abut to each other after the cutting mat A is folded, as shown in FIG. 5, and the folded cutting mat A is thinned and has a good flatness for promoting the quality of the cutting mat A in accordance with the present invention. With reference to FIG. 8, the printed antiskid layer 30 also disposed on the bock of the foldable sheet 20 such that the cutting mat A provides a comprehensive antiskid effect for promoting the safety of the cutting mat A even the tool top is operated within the foldable sheet 20. Furthermore, the printed antiskid layer 30 is made of soft PVC or soft non-slip ink such that the printed antiskid layer 30 does not be shrunk and can be recycled with the baseboard 10. As a result, the printed antiskid layer 30 on the cutting mat in accordance with the present invention does not cause a secondary pollution.

Although the invention has been explained in relation to its preferred embodiment, it is to be understood that many other possible modifications and variations can be made without departing from the spirit and scope of the invention as hereinafter claimed.

I claim:

1. A cutting mat comprising:
    a pair of baseboards each having a front and a back, the front having a cutting surface form thereon, said pair of baseboards being adjacent to each other;
    at least one foldable sheet connecting said pair of baseboards, the foldable sheet being attached to the backs of said pair of baseboards, the foldable sheet having a pre-folding line formed thereon and aligned at an abutment of said pair of baseboards, the foldable sheet being foldable along the pre-folding line with said pair of baseboards such that said pair of baseboards are foldable between a first position in which said pair of baseboards are in planar alignment and a second position in which the backs of said pair of baseboards are in a back-to-back abutting relationship, said pair of baseboards having edges abutting each other in the first position; and
    a plurality of antiskid units printed and distributed onto the backs of said pair of baseboards and on a side of the foldable sheet opposite the backs of said pair of baseboards, each of said plurality of antiskid units having a thickness of between 0.05 millimeters and 0.5 millimeters.

2. The cutting mat of claim 1, each of the plurality of antiskid units having a shape selected from the group consisting of a circle and a flower.

* * * * *